US011126054B2

(12) United States Patent
Wang et al.

(10) Patent No.: US 11,126,054 B2
(45) Date of Patent: Sep. 21, 2021

(54) DISPLAY PANEL AND DISPLAY DEVICE (71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Xianqin Meng, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 105 days.

(21) Appl. No.: 15/767,849

(22) PCT Filed: Sep. 13, 2017

(86) PCT No.: PCT/CN2017/101477
§ 371 (c)(1),
(2) Date: Apr. 12, 2018

(87) PCT Pub. No.: WO2018/076948
PCT Pub. Date: May 3, 2018

(65) Prior Publication Data
US 2019/0094575 A1 Mar. 28, 2019

(30) Foreign Application Priority Data

Oct. 24, 2016 (CN) .......................... 201610932286.6

(51) Int. Cl.
*G02F 1/137* (2006.01)
*G02F 1/29* (2006.01)
(Continued)

(52) U.S. Cl.
CPC ............ *G02F 1/137* (2013.01); *G02B 6/005* (2013.01); *G02B 6/0076* (2013.01); *G02B 30/26* (2020.01);
(Continued)

(58) Field of Classification Search
CPC .. G02F 1/137; G02F 1/1326; G02F 1/133504; G02F 1/133615;
(Continued)

(56) References Cited

U.S. PATENT DOCUMENTS

2004/0135942 A1* 7/2004 Lee .................... G02F 1/133615
349/113
2011/0007243 A1* 1/2011 Tanaka ...................... C09B 7/00
349/96

(Continued)

FOREIGN PATENT DOCUMENTS

CN 102799024 A 11/2012
CN 103209332 A 7/2013
(Continued)

OTHER PUBLICATIONS

International Search Report and Written Opinion dated Dec. 19, 2017; PCT/CN2017/101477.

*Primary Examiner* — Nathanael R Briggs
*Assistant Examiner* — William D Peterson (57) ABSTRACT A display panel and a display device are provided. The display panel includes: a lower substrate and an upper substrate cell-assembled together; a light-emitting control layer disposed between the lower substrate and the upper substrate; and a plurality of pixel units defined by a plurality of data lines and gate lines intersected with each other. Each pixel unit includes a plurality of subpixel areas. One or more side surfaces of the lower substrate are configured to receive incidence of the collimated light. The light-emitting control layer is configured to control the light-emitting directions and the light-emitting colors of the subpixel areas, to allow the light-emitting directions of the subpixel areas toward the central portion of the display panel. The light-emitting control layer is also configured to control the display grayscale of the subpixel areas.

20 Claims, 8 Drawing Sheets (51) Int. Cl.
*F21V 8/00* (2006.01)
*G02F 1/1362* (2006.01)
*G02F 1/1368* (2006.01)
*G02F 1/1335* (2006.01)
*G02F 1/13357* (2006.01)
*G02F 1/13* (2006.01)
*G02B 30/26* (2020.01)

(52) U.S. Cl.
CPC .......... *G02F 1/1326* (2013.01); *G02F 1/1368* (2013.01); *G02F 1/133504* (2013.01); *G02F 1/133615* (2013.01); *G02F 1/136286* (2013.01); *G02F 1/29* (2013.01); G02B 6/0055 (2013.01); *G02F 1/13793* (2021.01); *G02F 2201/121* (2013.01); *G02F 2201/123* (2013.01); *G02F 2201/30* (2013.01); *G02F 2201/302* (2013.01); *G02F 2201/305* (2013.01); *G02F 2203/01* (2013.01); *G02F 2203/30* (2013.01); *G02F 2203/34* (2013.01)

(58) Field of Classification Search
CPC .. G02F 1/136286; G02F 1/29; G02F 2201/30; G02F 2201/302; G02F 2201/305; G02F 2203/30; G02B 6/005

USPC .......................................................... 349/43
See application file for complete search history.

(56) References Cited

U.S. PATENT DOCUMENTS

| | | |
|---|---|---|
| 2015/0138455 A1 | 5/2015 | Liao et al. |
| 2015/0185546 A1* | 7/2015 | Lee .................... G02F 1/13363 |
| | | 349/33 |
| 2016/0182899 A1* | 6/2016 | Liu ........................ H04N 13/31 |
| | | 348/54 |

FOREIGN PATENT DOCUMENTS

| | | | | |
|---|---|---|---|---|
| CN | 104076518 A | | 10/2014 | |
| CN | 105572889 A | | 5/2016 | |
| CN | 106292051 A | * | 1/2017 | ........... G02F 1/1326 |
| CN | 106292052 A | | 1/2017 | |
| CN | 206096694 U | | 4/2017 | |
| WO | 2014/081415 A1 | | 5/2014 | |

* cited by examiner

DISPLAY PANEL AND DISPLAY DEVICE

CROSS REFERENCE TO RELATED APPLICATIONS

The application claims priority to the Chinese patent application No. 201610932286.6, filed Oct. 24, 2016 with SIPO and entitled "Display Panel and Display Device", which is incorporated herein by reference in its entirety.

TECHNICAL FIELD

Embodiments of the present disclosure relate to a display panel and a display device.

BACKGROUND

Currently, virtual reality (VR)/augmented reality (AR) display and transparent display are both realized by a liquid crystal display (LCD) panel or an organic light-emitting diode (OLED) display panel with the conventional structure.

Emergent light of the LCD with the conventional structure is generally divergent light. The direction of the emergent light cannot be controlled. Moreover, the LCD with the conventional structure has low transparency.

SUMMARY

Embodiments of the present disclosure provide a display panel and a display device.

At least one embodiment of the present disclosure provides a display panel, comprising: a lower substrate and an upper substrate cell-assembled together; a light-emitting control layer arranged between the lower substrate and the upper substrate; and a plurality of pixel units defined by a plurality of data lines and gate lines intersected with each other, each pixel unit including a plurality of subpixel areas. One or more side surfaces of the lower substrate are configured to receive the incidence of collimated light. The light-emitting control layer is configured to control the light-emitting directions and the light-emitting colors of the subpixel areas, to allow the light-emitting directions of the subpixel areas toward a central portion of the display panel, and the light-emitting control layer is also configured to control the display grayscale of the subpixel areas.

Embodiments of the present disclosure also provide a display device, comprising the backlight module.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, a person of ordinary skill in the art can obtain other embodiment(s), without any creative work, which shall be within the scope of the disclosure.

Figure 1:
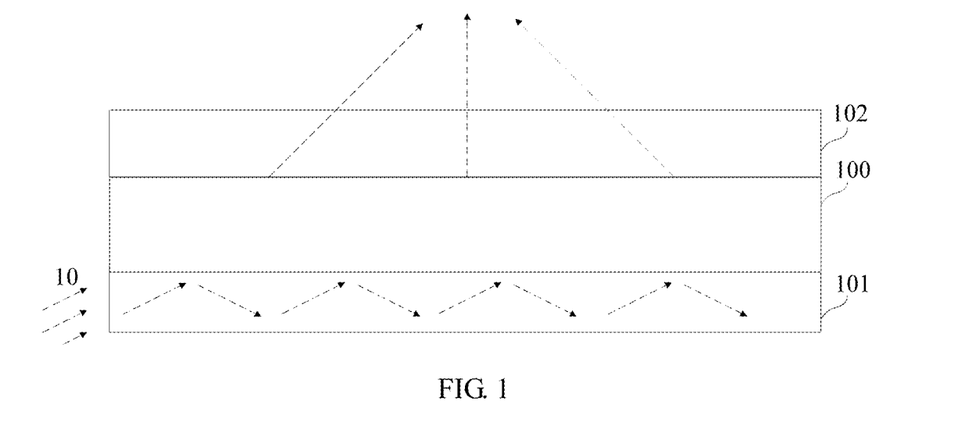
FIG. 1 is a schematic structural view of a display panel provided by an embodiment of the present disclosure.

The embodiment of the present disclosure provides a display panel, which comprises a plurality of subpixel areas. FIG. 1 is a schematic structural view of the display panel provided by an embodiment of the present disclosure. As illustrated in FIG. 1, the display panel comprises a lower substrate 101 and an upper substrate 102 cell-assembled together, and a light-emitting control layer 100 disposed between the lower substrate 101 and the upper substrate 102. One or more side surfaces of the lower substrate 101 are configured to receive the incidence of collimated light 10. The light-emitting control layer 100 is configured to control the light-emitting direction and the light-emitting color of the subpixel areas, so that the light-emitting direction of the subpixel areas can face a central portion of the display panel. The light-emitting control layer 100 is also configured to control the display grayscale of the subpixel areas.

The description that the light-emitting control layer 100 is configured to control the light-emitting direction and the light-emitting color of the subpixel areas refers to: controlling light with a given color to emit from the subpixel areas in a given direction.

Each pixel unit or pixel area is defined by a plurality of data lines and a plurality of gate lines which are intersected with each other. Each pixel unit 11 includes a plurality of subpixel areas. For instance, each pixel unit may include three subpixel areas, e.g., red, green and blue, however, the embodiment of the present disclosure is not limited thereto. The display control of the pixel area can be realized by adoption of the light-emitting control layer 100 to control the light-emitting color of the three subpixel areas to be respectively red, green and blue, and subsequently control the display grayscale of the three subpixel areas.

The substrate is, for instance, a plastic substrate, a glass substrate, a quartz substrate, or the like.

In the embodiment of the present disclosure, by arranging the light-emitting control layer between the upper and lower substrates and configured to control the light-emitting direction of the subpixel areas and allow the light-emitting direction of the subpixel areas to face the central portion of the display panel, the direction control of emergent light of the display panel is realized, so near-eye display (NED) can be realized through the display panel. In addition, as the display device may not be provided with a polarizer and the light-emitting control layer can also control the light-emitting colors of the subpixel areas, the original color filter layer of the display panel may be omitted, so the transparency of the display panel can be greatly improved.

A side surface of the lower substrate 101 is a surface disposed between the bottom and the top; the bottom of the lower substrate 101 is a surface away from the upper substrate; and the top of the lower substrate 101 is a surface facing the upper substrate.

Figure 2:
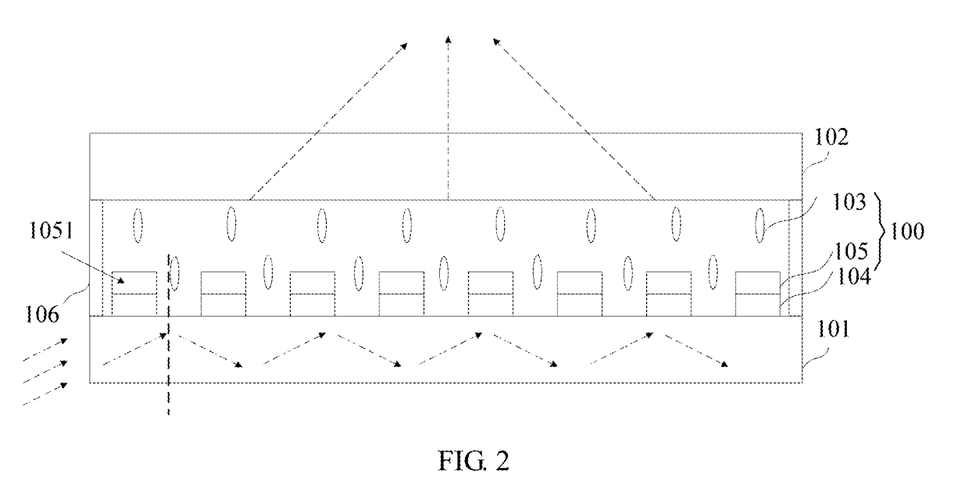
FIG. 2 is a schematic structural view of another display panel provided by an embodiment of the present disclosure.

FIG. 2 is a schematic structural view of another display panel provided by an embodiment of the present disclosure. Compared with the display panel as shown in FIG. 1, the light-emitting control layer 100 in the display panel includes liquid crystals 103, a grating layer 104, and an electrode layer 105. As shown in FIG. 2, the display panel comprises a lower substrate 101 and an upper substrate 102 which are cell-assembled together, and the liquid crystals 103 disposed between the lower substrate 101 and the upper substrate 102. One or more (one respectively in two orthogonal directions on a display plane) side surfaces (as shown in FIG. 2, the side surface of the lower substrate is a light-receiving surface) of the lower substrate 101 are used for the incidence of collimated light. The display panel further comprises the grating layer 104 and the electrode layer 105 disposed on a surface of the lower substrate 101 facing the upper substrate 102. The refractive index of the grating layer 104 is n, and $n_o \leq n \leq n_e$, where $n_o$ refers to the ordinary refraction index of the liquid crystals 103, and $n_e$ refers to the extraordinary refraction index of the liquid crystals 103. The ordinary light of the liquid crystals 103 refers to polarized light of which the polarization direction is perpendicular to the optical axis of the liquid crystals 103. The extraordinary light of the liquid crystals 103 refers to polarized light of which the polarization direction is parallel to the optical axis of the liquid crystals 103.

In the display panel as shown in FIG. 2, the lower substrate 101 and the grating layer 104 are arranged together to form wave-guide grating couplers; one or more side surfaces of the lower substrate 101 are used for the incidence of collimated light 10. When an included angle is formed between the collimated light and a surface of the lower substrate 101 facing the upper substrate 102 and is greater than the critical angle of light incident into the upper substrate 102 from an upper surface of the lower substrate 101, after the collimated light 10 is incident into the lower substrate 101, total reflection occurs in the lower substrate 101, and m-order guided mode is generated. The selection of the light-emitting direction and color can be realized by the coupling of a given mode in a wave guide layer (namely the lower substrate) by the wave-guide grating coupler, namely the wave-guide grating coupler couples light with given wavelength from one surface of the display panel in a given direction. The refractive index of the wave-guide grating couplers is set to be $[n_o, n_e]$, and subsequently, the refractive index of a liquid crystal layer can be adjusted by adoption of the electrode layer to adjust the voltage applied to the liquid crystal layer, so the display grayscale can be controlled. For instance, the grating layer 104 is disposed between the upper and lower substrates, and slits of the grating layer 104 are filled with the liquid crystals 103. When the liquid crystals 103 of a certain pixel are deflected under the control of the voltage of the electrode layer 105 and the refractive index of the liquid crystals 103 is equal to that of the grating layer 104, in this case, the liquid crystals 103 and the gratings may be regarded as same material and are equivalent to an integral structure, and the function of the gratings is covered, so light cannot be coupled from the lower substrate 101; and in this case, the display grayscale is minimum (the grayscale is $L_0$). When the difference between the refractive index of the liquid crystals 103 and the refractive index of the grating layer 104 is maximum, the function of the gratings is the most significant, and the coupling function of the light is the strongest; in this case, the display grayscale is maximum (the grayscale is L255). In this way, the grayscale of the pixels can be adjusted by adjustment of the voltage of each electrode corresponding to each pixel. Due to the selection function of the wave-guide grating coupler on the light-emitting direction, for instance, as the light-emitting direction of the areas of the display panel is relevant to the grating period, the light-emitting direction of the areas may be changed by setting different grating periods. The light emitted from the display panel may be converged to a given viewpoint position. When the human pupil is near the viewpoint position, a 3D image displayed by the display panel can be seen clearly by loading given display content. The display panel may be used for realizing near-eye display, naked eye 3D, light field display, or the like. As the wave-guide grating coupler only requires several grating periods to effectively couple the light from the wave guide layer, and the grating period corresponding to each pixel is generally small and the grating area corresponding to each pixel is small, the pixel dimension may be very small, which is favorable to realize high-resolution display. Due to the selection function of the wave-guide grating coupler on the light-emitting color (when seen at a given viewpoint), color filter film can be omitted. Moreover, the display panel adopts the wave-guide grating coupler to directly couple the incident collimated light into the display panel, the polarizer in the LCD is omitted; and all the components of the display panel are made from high-transmittance materials, so high-transparency transparent display and VR/AR display can be realized. As the structure adopts the lower substrate for wave guide, the thickness of the lower substrate is relatively large, and the incident area is large, so high light efficiency can be realized. In addition, the display device may be also used for flat panel display. In this case, the gratings select large period (more than 1 μm) and have more diffraction orders, and uniform display within certain angular field of view is realized by combining with some scattering structures, such as scattering membranes.

Figure 13:
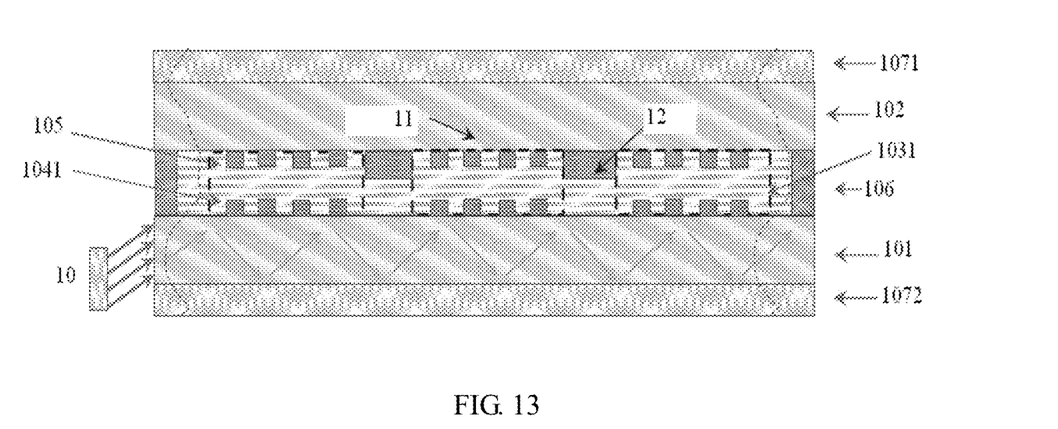
FIG. 13 is a schematic structural view 1 of the IPS (In-Plane-Switch)-VA (Vertical Alignment) driving mode of still another display panel provided by an embodiment of the present disclosure.

In the embodiment of the present disclosure, the grating layer 104 includes a plurality of gratings 1041 corresponding to the subpixel areas. As shown in FIG. 13, the grating corresponding to the subpixel area of each pixel unit has fixed grating period. As the grating with fixed grating period is set for each subpixel area, the light-emitting angle and the light-emitting color of the subpixel areas are set as required. On one hand, the requirement of NED, such as VR and AR, on the light-emitting direction can be satisfied. In addition, the selection of the light-emitting color is realized through the gratings when viewed at a given viewpoint, and a CF layer is not required to be arranged, so that high-transparency transparent display and VR/AR display can be realized.

For instance, to control the light-emitting direction of the subpixel areas, the light-emitting direction of the subpixel areas is allowed to face the central portion of the display panel, and the grating period of the gratings is gradually varied from the central portion to the periphery of the display panel.

For instance, the grating periods of the gratings corresponding to any two adjacent subpixel areas may be different; and the grating periods of the gratings corresponding to a plurality of subpixel areas may also be the same, and subsequently, the grating periods of the gratings corresponding to the plurality of subpixel areas and a plurality of adjacent subpixel areas are different.

For instance, in an embodiment, the display area of the display panel includes a plurality of data lines and a plurality of scanning lines (disposed in the upper substrate or the lower substrate); the plurality of data lines and the plurality of scanning lines are intersected to form a plurality of pixel units arranged in an array; each pixel unit includes a plurality of subpixel areas, e.g., R, G, B areas; and each subpixel area corresponds to one subpixel. Each pixel unit may be independently controlled. The embodiment of the present disclosure is not limited thereto.

For instance, total reflection occurs in the lower substrate 101, and m-order guided mode is generated; the effective refractive index of the m-order guided mode in the lower substrate 101 is $N_m$; λ refers to the wavelength of light emitted from the lower substrate 101; in this case, the following relationship is satisfied:

$$2\pi/\lambda \cdot N_m = 2\pi/\lambda \cdot n_e \sin\theta + q2\pi/\wedge, q=0,\pm1,\pm2,\ldots$$

where θ refers to an included angle between the light-emitting direction and the plane normal of the display panel; $n_e$ refers to the refractive index of air; and $\wedge$ refers to the grating period. In a general AR or VR application scene, the light-emitting direction of pixels at certain position on the display panel tends to be fixed (determined by the position of the pixel relative to the human eyes; as shown in FIG. 2, light emitted from the pixels at various positions to the eyes may be as shown in FIG. 2), namely θ in the above formula is fixed. In this case, the emission of light with a given color (corresponding to the wavelength λ of emergent light) in a given direction (corresponding to the included angle θ) can be realized by adjusting the grating period $\wedge$.

In embodiments of the present disclosure, the display mode of the display panel may be horizontal electric field mode or vertical electric field mode. The horizontal electric field mode includes In-Plane Switching (IPS) and Vertical Alignment (VA). The vertical electric field mode includes Electrically Controlled Birefringence (ECB).

Figure 3:
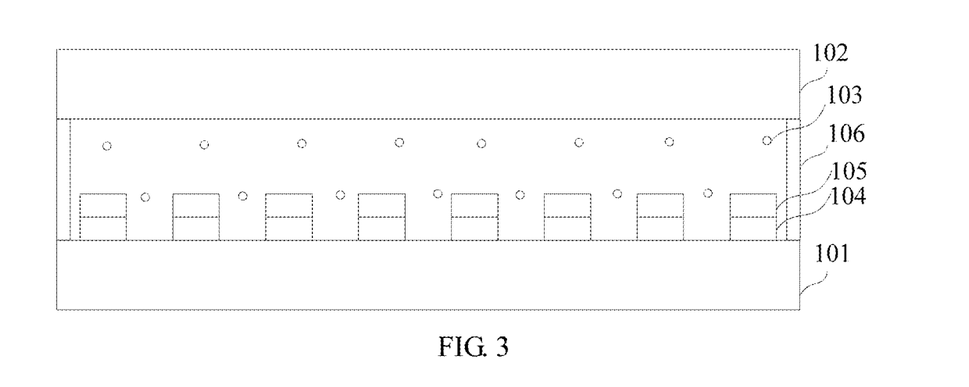
FIG. 3 is a schematic structural view of another display panel provided by an embodiment of the present disclosure.
Figure 4:
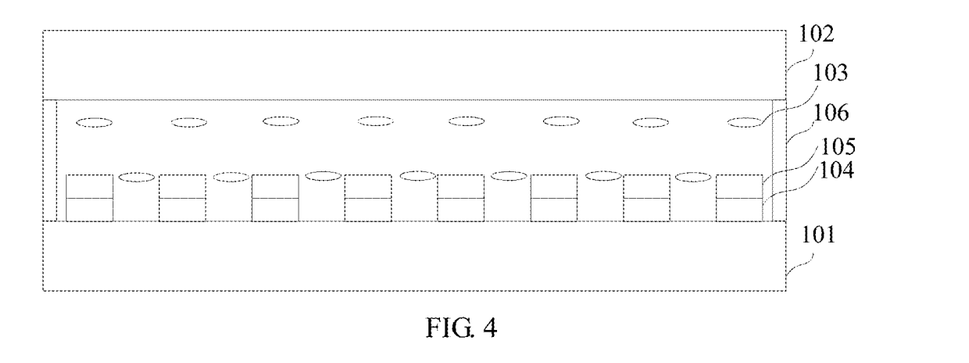
FIG. 4 is a schematic structural view of another display panel provided by an embodiment of the present disclosure.
Figure 15:
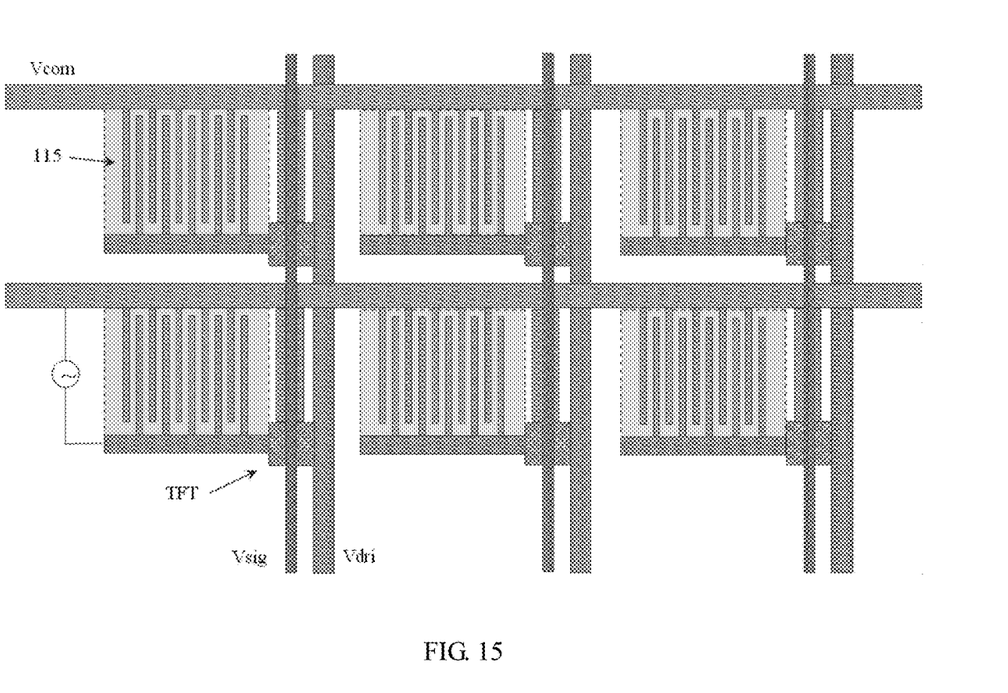
FIG. 15 is a schematic diagram of the IPS-VA driving mode of a display panel provided by an embodiment of the present disclosure.

FIGS. 2-4 are schematic structural views of display panels adopting horizontal electric field mode. In the horizontal electric field mode, the electrode layer 105 includes a plurality of pairs of strip electrodes 1051 (each pair of strip electrodes 1051 includes two strip electrodes 1051) arranged in a same layer; each subpixel area corresponds to at least one pair of strip electrodes 1051; the lower substrate 101 includes a base substrate and TFT array units (as shown in FIG. 15) disposed on the base substrate; and the TFT array units are connected with the strip electrodes 1051, in this way, the liquid crystal control of the subpixels is realized, and accurate control of the grayscale is realized. For instance, the strip electrodes 1051 are alternately arranged positively and negatively (each pair of strip electrodes 1051 includes a positive electrode and a negative electrode); the strip electrodes 1051 are divided into two groups according to the polarity, i.e., one group is electrically connected with the TFT array units, so that the pixel voltage can be obtained; and the other group is connected with the common voltage.

As shown in FIGS. 2-4 and FIGS. 13, and 16, the strip electrodes 1051 are superimposed on the gratings, to avoid the impact of the electrodes on the luminous efficiency of the wave-guide gratings. In this case, the strip electrodes 1051 and grating bars 1041 correspond to each other. To keep the grating effect, each subpixel area corresponds to at least three pairs of strip electrodes.

In the embodiment, the upper substrate 102 may be a transparent substrate, such as a glass substrate, or a resin substrate. The thickness of the upper substrate 102 is 0.1-2 mm. The refractive index of the upper substrate 102 is 1.5-1.6, e.g., 1.52. In addition, the upper substrate 102 has good flatness and parallelism, so as to realize the arrangement of other film layers.

In the embodiment, the base substrate in the lower substrate 101 may be a transparent substrate, such as a glass substrate, or a resin substrate. The thickness of the lower substrate 101 is 0.1-2 mm. The refractive index of the lower substrate 101 is 1.6-2.0, e.g., 1.7-1.8. In addition, the lower substrate 101 has good flatness and parallelism, so as to realize the arrangement of other film layers. The refractive index of the lower substrate is greater than that of adjacent layers (including the liquid crystals and the grating layer).

Figure 5:
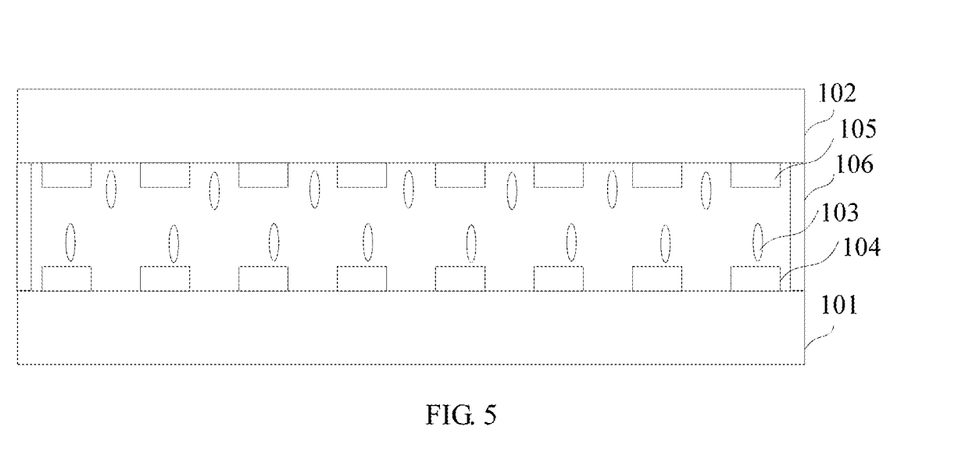
FIG. 5 is a schematic structural view of another display panel provided by an embodiment of the present disclosure.

In addition, as shown in FIGS. 2-4, the electrode layer 105 is disposed on the lower substrate 101. In another embodiment, the electrode layer 105 may also be disposed on the upper substrate 102. As shown in FIG. 5, the electrode layer 105 is disposed on a surface of the upper substrate 102 facing the lower substrate 101.

In the embodiment, the upper substrate 102 may include a base substrate and TFT array units disposed on the base substrate. The TFT array units are electrically connected with the strip electrodes of the electrode layer 105.

Figure 6:
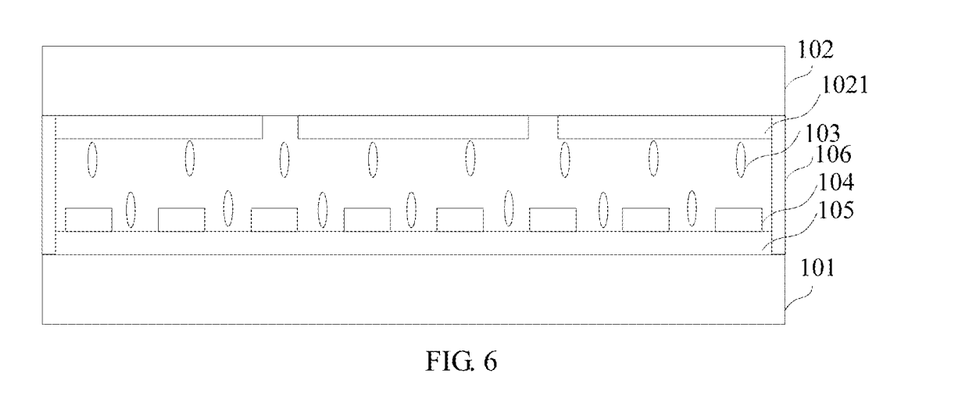
FIG. 6 is a schematic structural view of another display panel provided by an embodiment of the present disclosure.
Figure 7:
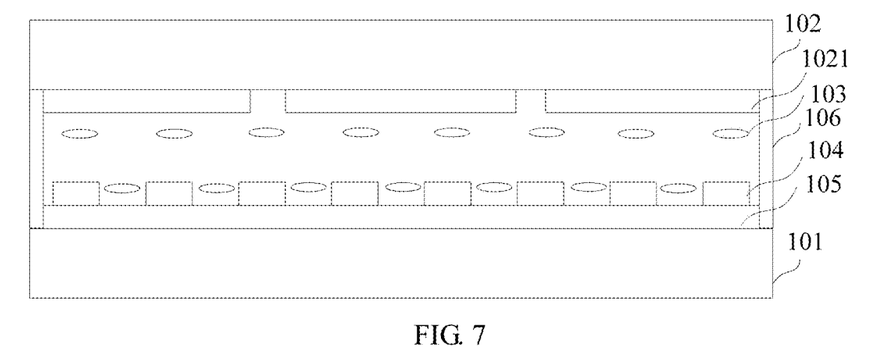
FIG. 7 is a schematic structural view of another display panel provided by an embodiment of the present disclosure.
Figure 8:
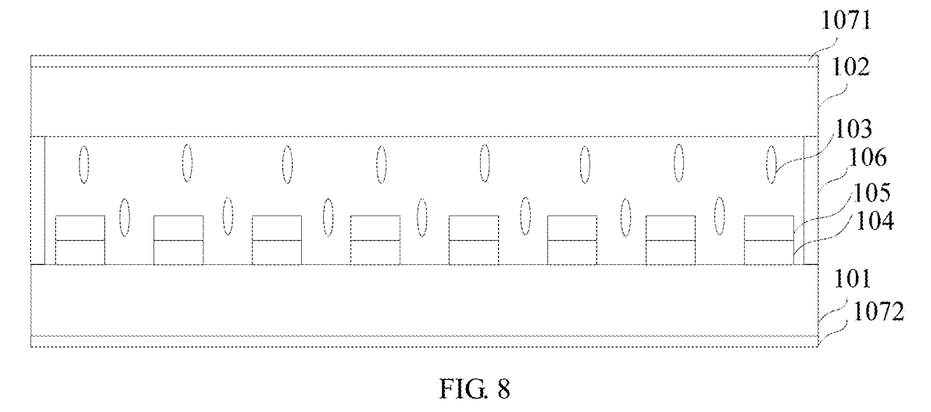
FIG. 8 is a schematic structural view of another display panel provided by an embodiment of the present disclosure.

FIGS. 6 and 7 are schematic structural views of a display panel adopting vertical electric field mode. In the vertical electric field mode, the electrode layer 105 is planar electrodes, and the grating layer 104 is disposed on the electrode layer; the upper substrate 102 is an array substrate; and the array substrate includes block electrodes 1021 corresponding to the subpixel areas. The upper substrate 102 is an array substrate, and the array substrate includes block electrodes 1021 corresponding to sub-pixel areas, respectively. The upper substrate 102 is an array substrate, and the deflection of the liquid crystals is controlled by electric fields generated between the block electrodes 1021 of the array substrate and the electrode layer 105, so as to realize accurate control of the grayscale. In addition, as the electrode layer 105 is a planar electrode and the grating layer 104 is disposed on the electrode layer 105, and the slits of the gratings can be filled with the liquid crystals.

In the embodiment, the array substrate includes the block electrodes 1021, a base substrate and a TFT circuit, in which the structure and the properties of the base substrate may be the same as the structure and the properties of the upper substrate 102 in the horizontal electric field mode. No further detailed description will be repeated here.

In the embodiment, the structure and the properties of the lower substrate 101 may be the same as the structure and the properties of the base substrate of the lower substrate 101 in the horizontal electric field mode. No further detailed description will be repeated here.

FIGS. 3 and 4 may be two schematic state diagrams of an IPS display panel. As shown in FIGS. 3 and 4, the initial direction of liquid crystals in the IPS display panel is as shown in FIG. 3: the initial direction of the liquid crystals is parallel to a lower substrate and parallel to the lengthwise direction of strip electrodes. When electrodes are electrified, the liquid crystals are deflected and the direction is converted into a direction as shown in FIG. 4 (parallel to the lower substrate and perpendicular to the lengthwise direction of the strip electrodes). For example, in a case that the refractive index of the grating layer is equal to $n_o$, when the refractive index of the liquid crystals and the refractive index of a grating layer are equal to each other and both of them are $n_o$, the function of the grating layer is covered. In this case, no light is coupled from the lower substrate; and the grayscale is minimum and is L0. When the difference between the refractive index of the liquid crystals ($n_e$) and the refractive index of the gratings ($n_o$) is maximum, the function of the grating layer is the most significant, and the coupling efficiency of light coupled from the lower substrate is the highest, and in this case, the grayscale is maximum and is L255. When the refractive index of the liquid crystals is between the above two cases, other grayscales are provided. As the change of the refractive index can be sensed when the polarization direction is in a first direction and a second direction, in which the first direction is that the polarization direction is perpendicular to the lengthwise direction of the strip electrodes and the second direction is that the polarization direction is parallel to the lower substrate and parallel to the lengthwise direction of the strip electrodes, one kind of polarized light (in the first direction or the second direction) is selected by adding a layer of polarizer on a surface of an upper substrate or on an edge-lit light source. In addition, for nematic phase liquid crystals, a layer of alignment film is generally required to be added on an upper surface of the liquid crystal layer or upper and lower surfaces are respectively provided with an alignment film (not shown) to control the initial direction of the liquid crystals (which is not required by some liquid crystal materials), so that the liquid crystals can rotate in the above form under an applied voltage. In addition, the relative relationship between the initial direction of the liquid crystals and the analysis direction of the polarizer is controlled to determine whether the display panel adopts normally white mode (the initial direction of the liquid crystals is consistent with the analysis direction of the polarizer) or normally black mode (the initial direction of the liquid crystals is perpendicular to the analysis direction of the polarizer). Under the display mode, the liquid crystals may be positive liquid crystals or negative liquid crystals.

FIGS. 2 and 4 may be two schematic state diagrams of a Vertical Alignment (VA) type display panel. As shown in FIGS. 2 and 4, the initial direction of liquid crystals in the VA type display panel is as shown in FIG. 2; the initial direction of the liquid crystals is perpendicular to a lower substrate. When electrodes are electrified, the deflection direction of the liquid crystals is converted into a direction as shown in FIG. 4 (parallel to the lower substrate and perpendicular to the lengthwise direction of strip electrodes). For example, in a case that the refractive index of a grating layer is $n_o$, when the refractive index of the liquid crystals and the refractive index of the grating layer are equal to each other and both of them are $n_o$, the function of the grating layer is covered, and no light is coupled from the lower substrate, and in this case, the grayscale is minimum and is L0. When the difference between the refractive index of the liquid crystals ($n_e$) and the refractive index of the gratings ($n_o$) is maximum, the function of the grating layer is the most significant, the coupling efficiency of light coupled from the lower substrate is the highest, and in this case, the grayscale is maximum and is L255. When the refractive index of the liquid crystals is between the above two cases, other grayscales are provided. In the embodiment, the change of the refractive index can be sensed only when the polarization direction of the light coupled by the gratings is the first direction, and light in other polarization directions realizes refractive index change through the liquid crystals, so no polarizer is required to be arranged. In addition, for nematic phase liquid crystals, a layer of alignment film is generally required to be added on an upper surface of a liquid crystal layer or upper and lower surfaces are respectively provided with an alignment film (not shown) to control the initial direction of the liquid crystals (which is not required by some liquid crystal materials), so that the liquid crystals can rotate in the above form under an applied voltage. In addition, the VA type display panel adopts normally white mode. The described above is the case that the refractive index of the grating layer is equal to or close to $n_o$, in this way, normal display can be realized without adding a polarizer on a light-emitting side of the display device or requiring an edge-lit collimated light source to be polarized light. When the refractive index of the grating layer is equal to $n_e$ or between $n_o$ and $n_e$, in this case, a polarizer is required to be added on the light-emitting side of the display device or the edge-lit collimated light source is required to be polarized light, so as to eliminate the interference of polarized light of which the light emission condition is not controlled by the alignment deflection of the liquid crystals. Under the display mode, the liquid crystals are required to be positive liquid crystals.

FIGS. 6 and 7 are two schematic state diagrams of an ECB type display panel. As shown in FIGS. 6 and 7, the initial direction of liquid crystals in the ECB type display panel is as shown in FIG. 7, and the initial direction of the liquid crystals is parallel to a lower substrate. When electrodes are electrified, the deflection direction of the liquid crystals is converted into a direction as shown in FIG. 6 (perpendicular to the lower substrate). For example, in a case that the refractive index of a grating layer is $n_o$, when the refractive index of the liquid crystals and the refractive index of a grating layer are equal to each other and both of them are $n_o$, the function of the grating layer is covered, no light is coupled from the lower substrate, and in this case, the grayscale is minimum and is L0. When the difference between the refractive index of the liquid crystals ($n_e$) and the refractive index of the gratings ($n_o$) is maximum, the function of the grating layer is the most significant, the coupling efficiency of light coupled from the lower substrate is the highest, and in this case, the grayscale is maximum and is L255. When the refractive index of the liquid crystals is between the above two cases, other grayscales are provided. In the embodiment, the change of the refractive index can be sensed only when the polarization direction of the light coupled by the gratings is parallel to the lower substrate and perpendicular to the lengthwise direction of the gratings, and light in other polarization directions will not sense the change of the refractive index, so no polarizer is required to be arranged. In addition, for nematic phase liquid crystals, a layer of alignment layer is generally required to be added on an upper surface of a liquid crystal layer or both upper and lower surfaces are provided with an alignment film (not shown) to control the initial direction of the liquid crystals (which is not required by some liquid crystal materials, for example, blue phase liquid crystals), so that the liquid crystals can rotate in the above form under an applied voltage. In addition, the initial direction of the liquid crystals is controlled to determine whether the display panel adopts normally white mode or normally black mode. That described above is the case that the refractive index of the grating layer is equal to or close to $n_o$, in this way, normal display can be realized without adding a polarizer on a light-emitting side of the display device or requiring an edge-lit collimated light source to be polarized light. When the refractive index of the grating layer is equal to $n_e$ or between $n_o$ and $n_e$, in this case, a polarizer is required to be added on the light-emitting side of the display device or the edge-lit collimated light source is required to be polarized light, so as to eliminate the interference of polarized light of which the light emission condition is not controlled by the alignment deflection of the liquid crystals. Under the display mode, the liquid crystals are required to be positive liquid crystals.

The above description on various display modes is all based on the nematic phase liquid crystals. In another embodiment, in the above proposal, the liquid crystals 103 may be blue phase liquid crystals. When the blue phase liquid crystals are adopted, the alignment film is not required. Under non-electrified state, the blue phase liquid crystals are isotropic; the refractive indices are same in various directions; and the refractive indices of two kinds of polarized light running through the liquid crystals are both n. Under electrified state, the blue phase liquid crystals are anisotropic, the ordinary refractive index is $n_o$, the extraordinary refractive index is $n_e$, and $n_o<n<n_e$. The isotropic state may be selected as L0 state (the refractive index of the gratings is n), and the anisotropic state may be selected as L255 state. In this case, both of the two kinds of polarized light can be coupled, so high luminous efficiency can be obtained. The anisotropic state may also be selected as L0 state (the refractive index of the gratings is $n_o$ or $n_e$), and the isotropic state may also be selected as L255 state. In this case, incident light is required to be polarized light, or a polarizer is required to be added on a light-emitting side.

In the embodiment of the present disclosure, the display panel also comprises driving units. The driving units are configured to apply a voltage to the strip electrodes 1051 or the block electrodes 1021 corresponding to the subpixel areas of the pixel units. The liquid crystals corresponding to the subpixel areas are allowed to deflect to a corresponding angle by adoption of the driving units to apply a voltage to the strip electrodes 1051 or the block electrodes 1021 corresponding to the subpixel areas, so that the different display grayscales can be obtained. The maximum grayscale is L255, and the minimum grayscale is L0. And 256 grayscales are realized by gradually adjusting the applied voltage.

In the embodiment of the present disclosure, the grating layer may be made from transparent dielectric materials. The grating period is determined by the designed light-emitting direction and color. The duty ratio is about 0.5. In actual product design, the duty ratio may be set as required (for instance, considering the objective of adjusting the luminous intensity or balancing the difference of brightness at different positions of the display panel). The thickness of the grating layer 104 may be 100 nm-1,000 nm, e.g., 500 nm. The above thickness satisfies the requirement on the coupling function of the gratings (no light is leaked out under a dark state). Gratings with same thickness may be selected for RGB subpixels, or gratings with different thicknesses may be respectively designed for the RGB subpixels. The embodiment of the present disclosure is not limited thereto.

In the embodiment of the present disclosure, the electrode layer 105 may be a transparent conductive material electrode layer and will not shield light emitted from the lower substrate 101. For instance, the electrode layer 105 may be a film layer, such as indium tin oxide (ITO), or may be a thin layer, such as metal molybdenum (Mo).

In the embodiment of the present disclosure, the thickness of the electrode layer 105 is 50-1,000 nm for transparent conductive materials, such as ITO, and is 30-200 nm for metallic conductive materials, so as to satisfy the above requirement and the demand of voltage applying.

In the embodiment of the present disclosure, the thickness of the liquid crystals between the upper substrate 102 and the lower substrate 101 is 1-5 μm, so that the grating layer can be covered and parameters, such as driving voltage, can be designed.

As shown in FIGS. 2-7, the display panel also comprises sealant 106. The upper substrate 102 and the lower substrate 101 are connected with each other through the sealant 106. The sealant 106 can also avoid light from being directly incident into the liquid crystals from the side surfaces of the lower substrate 101.

As shown in FIG. 8 and FIGS. 13-20, the display panel may also comprise a first protective film 1071 disposed on a surface of the upper substrate 102 away from the lower substrate 101 and a second protective film 1072 disposed on a surface of the lower substrate 101 away from the upper substrate 102. The refractive index of the second protective film 1072 is less than the refractive index of the lower substrate 101. The protective films are arranged to protect the display panel. As the refractive index of the second protective film 1072 is less than the refractive index of the lower substrate, light will not be exposed from the surface of the second protective film 1072. In addition, the refractive index of the first protective film 1071 is less than the refractive index of the upper substrate.

The first protective film 1071 and the second protective film 1072 may be a film layer attached to the upper substrate and the lower substrate, respectively, and the thickness of the film layer is less than about 0.5 mm. The first protective film 1071 and the second protective film 1072 may be a coating applied on the upper substrate and the lower substrate, and the thickness of the coating is less than about 10 μm. The refractive index of the first protective film 1071 and the second protective film 1072 is less than about 1.5.

Figure 9:
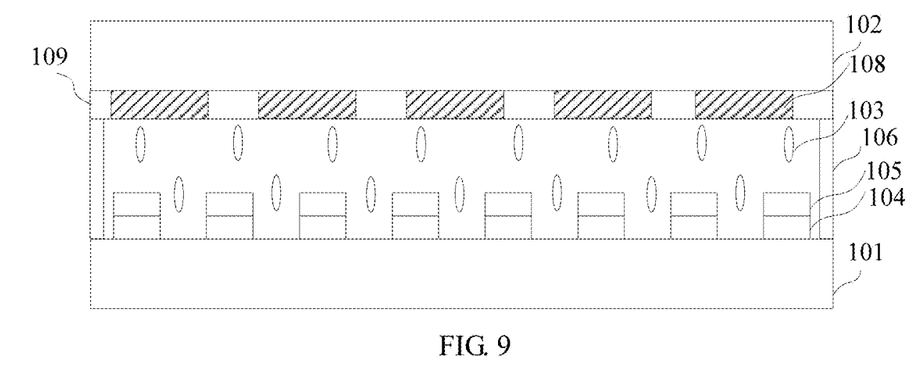
FIG. 9 is a schematic structural view of another display panel provided by an embodiment of the present disclosure.

As shown in FIG. 9, a quantum dot pixel layer 108 is disposed on the surface of the upper substrate 102 facing the lower substrate 101. The quantum dot pixel layer 108 scatters the direction of light emitted from the wave-guide grating couplers, so the display panel can realize flat panel display. The quantum dot pixel layer 108 is similar to a color filter layer (the blue part may directly use a scattering film).

The quantum dot pixel layer 108 has certain haze (haze refers to the percentage of the intensity of transmitted light deflected from the incident light at an angle of 2.5° or more in total transmitted light intensity) and can scatter the light-emitting direction, so flat panel display can be realized, and hence the display device with small thickness can be obtained. Light irradiated to the quantum dot pixel layer 108 through the lower substrate and the gratings may be both blue light. Red and green required to be displayed are realized by adoption of the blue light to excite quantum dots of the quantum dot pixel layer 108.

Figure 10:
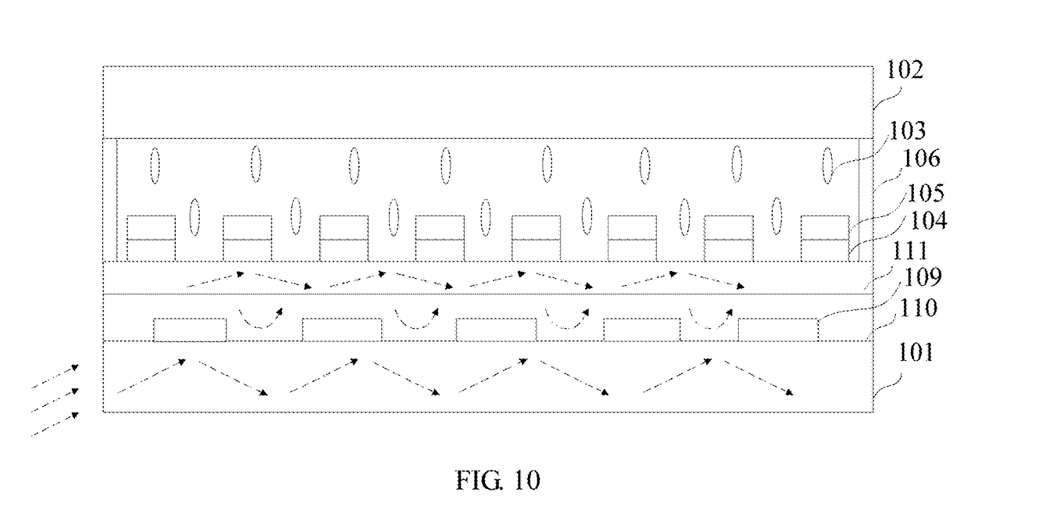
FIG. 10 is a schematic structural view of another display panel provided by an embodiment of the present disclosure.

As shown in FIG. 10, the display panel also comprises a coupling grating layer 109, a filling layer 110 and a wave guide layer 111 disposed between the lower substrate 101 and the grating layer 104 and sequentially arranged on the lower substrate 101. The thickness of the lower substrate 101 is greater than that of the wave guide layer 111. The refractive index of the filling layer 110 is less than that of the lower substrate 101. In the proposal, light of an edge-lit collimated backlight is coupled into the lower substrate, and subsequently, the optical wave guide mode therein is continuously coupled into the wave guide layer through coupling gratings in the filling layer. As the lower substrate here has large thickness (0.1-2 mm) and has high incident efficiency, the lower substrate, as an auxiliary wave guide of the main wave guide (the wave guide layer 111), can achieve an objective of improving the light efficiency.

The refractive index of the filling layer may be about 1.4. The thickness of the wave guide layer may be 100 nm-10 μm. The coupling grating period $\wedge$ satisfies:

$$2\pi/\lambda \cdot N^{Down}m = 2\pi/\lambda \cdot N^{Up}m + q2\pi/\wedge, q=0,\pm1,\pm2,\ldots,$$

where $N^{Up}m$ and $N^{Down}m$ are respectively the effective refractive index of m-order guided modes in the wave guide layer and the lower substrate.

Figure 11:
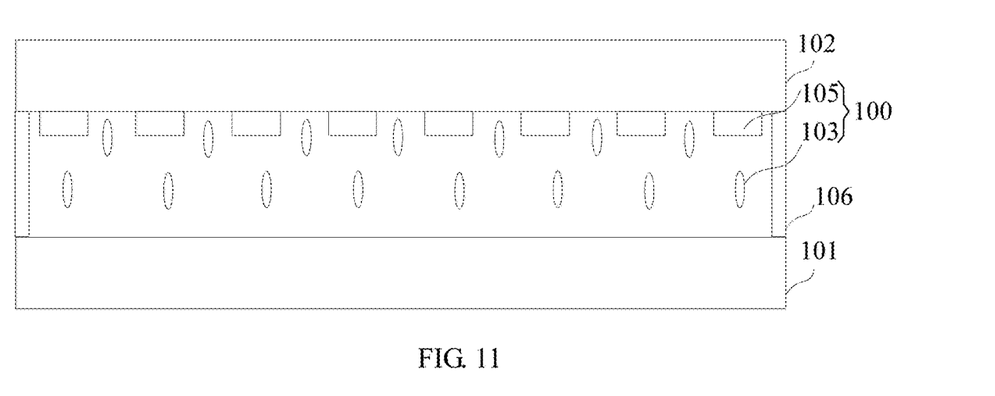
FIG. 11 is a schematic structural view of another display panel provided by an embodiment of the present disclosure.
Figure 12:
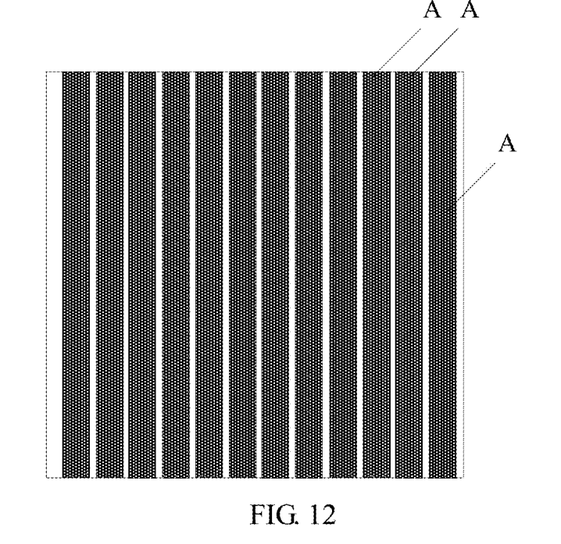
FIG. 12 is a schematic diagram illustrating liquid crystal area division in an embodiment of the present disclosure.

FIG. 11 is a schematic structural view of another display panel provided by an embodiment of the present disclosure. Compared with the display panel as shown in FIGS. 2-10, the light-emitting control layer 100 in the display panel only includes liquid crystals 103 and an electrode layer 105. The electrode layer 105 is disposed on a surface of an upper substrate 102 facing a lower substrate 101. The electrode layer 105 includes a plurality of strip electrodes which are configured to divide the display panel into a plurality of strip spacer regions. A given voltage is respectively applied to the liquid crystals 103 in the regions. The voltage applied to the liquid crystals 103 in each region is the same, and the voltages applied to the liquid crystals 103 in adjacent regions are different. As shown in FIG. 12, the liquid crystals in the display panel are divided into a plurality of strip spacer regions A. A voltage is applied to the liquid crystals 103 by the above way, so that the deflection state of the liquid crystals 103 under the electrified state is also distributed according to the strip spacer regions. The deflection of the liquid crystals 103 in the same region is same, and the deflection of the liquid crystals 103 in adjacent regions is different. The deflection mode of the liquid crystals can realize the effect of the gratings. The selection of the light-emitting direction and color can be realized by the coupling of given modes in the wave guide layer (namely the lower substrate 101) through the wave-guide grating coupler, namely the wave-guide grating coupler couples light with a given wavelength from a surface of the display panel in a given direction (see also FIGS. 14 and 17). In the embodiment, the display panel does not require the grating layer, so the structure of the device is simpler and the manufacturing process is simplified.

For instance, to allow the light-emitting direction of the subpixel areas to face the central portion of the display panel, the voltage applied to the liquid crystals by the electrode layer 105 is gradually varied from the central portion to the two sides of the display panel.

In the embodiment, horizontal electric field may be adopted, and in this case, the electrode layer 105 includes strip electrodes; and vertical electric field may be also adopted, and in this case, the electrode layer 105 includes block electrodes and a planar electrode is disposed on the lower substrate.

Figure 14:
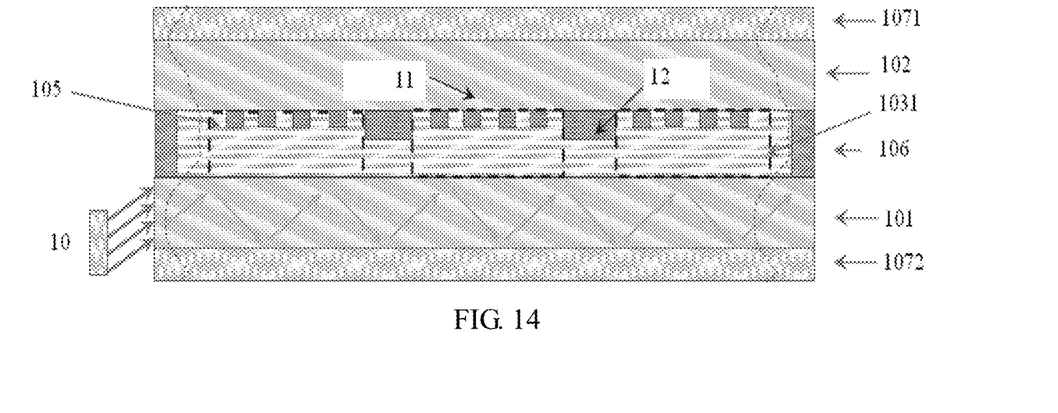
FIG. 14 is a schematic structural view 2 of the IPS-VA driving mode of still another display panel provided by the embodiment of the present disclosure.

For instance, FIGS. 13-15 are schematic structural views illustrating the pixel structure and wiring arrangement of a display panel adopting IPS or VA driving mode.

As shown in FIG. 13, an electrode layer 105, a grating layer 104 and a liquid crystal layer 1031 disposed therebetween are respectively disposed on the facing surfaces of upper and lower substrates 102 and 101, and the upper substrate 102 and the lower substrate 101 are connected with each other through sealant 106. Wiring areas 12 divide the display panel into a plurality of pixel openings 115 or pixel units. Each pixel area or unit 11 includes at least one electrode strip 1051 and at least one grating bar 1041 corresponding to each other. In addition, upper and lower protective films 1071 and 1072 may be also respectively disposed on the outside of the upper and lower substrates.

As shown in FIG. 14, in another embodiment of the present disclosure, the electrode layer 105 and the grating layer 104 may be sequentially disposed on one substrate. When they are disposed on one substrate, e.g., the upper substrate, the grating bars 1041 may be superimposed on the electrode strips 1051. In one embodiment, the width of the strip electrodes is not greater than the width of the grating bars.

As shown in FIG. 15, the wiring areas include signal electrodes Vsig, driving electrodes Vdri, TFT switches and common electrodes Vcom. These structures may be separated from each other by an insulating layer. Electrodes arranged in different layers but required to be connected may be connected with each other through via holes formed in corresponding insulating layers.

Figure 16:
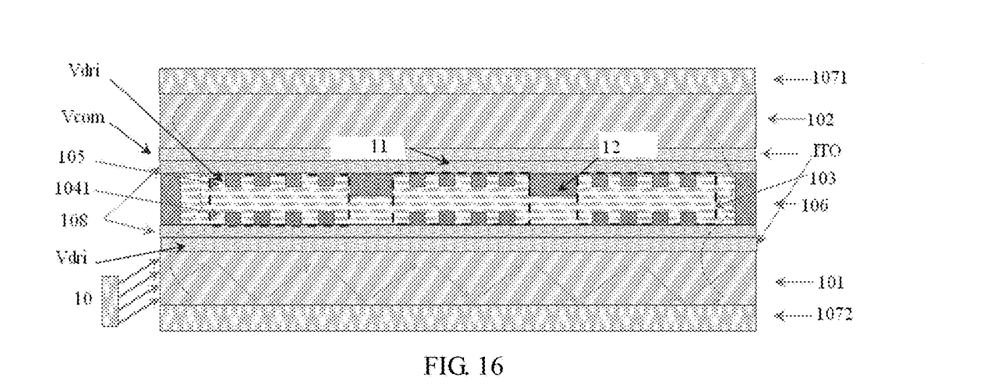
FIG. 16 is a schematic structural view 1 of the ADS (Advanced Super Dimension Switch)-VA(Vertical Alignment) driving mode of still another display panel provided by an embodiment of the present disclosure.
Figure 17:
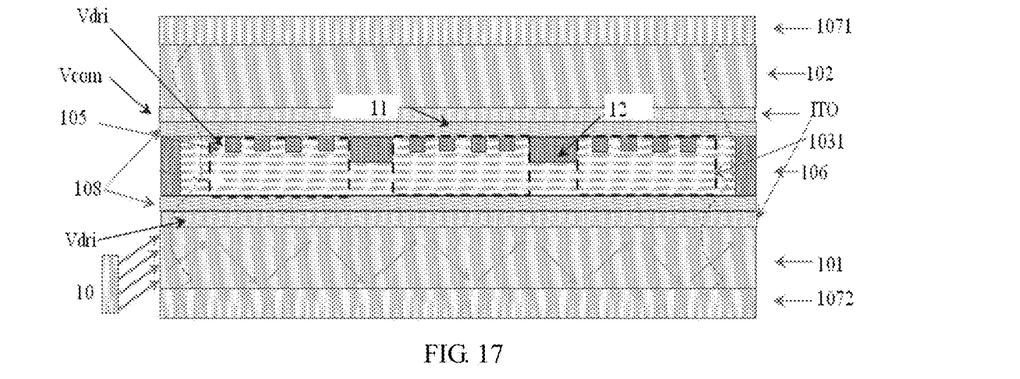
FIG. 17 is a schematic structural view 2 of the ADS-VA driving mode of still another display panel provided by an embodiment of the present disclosure.

For instance, it can be contemplated that a planar electrode, such as a planar common electrode Vcom as shown in FIGS. 16-17, may also be disposed on the facing surfaces of the upper and lower substrate.

Figure 18:
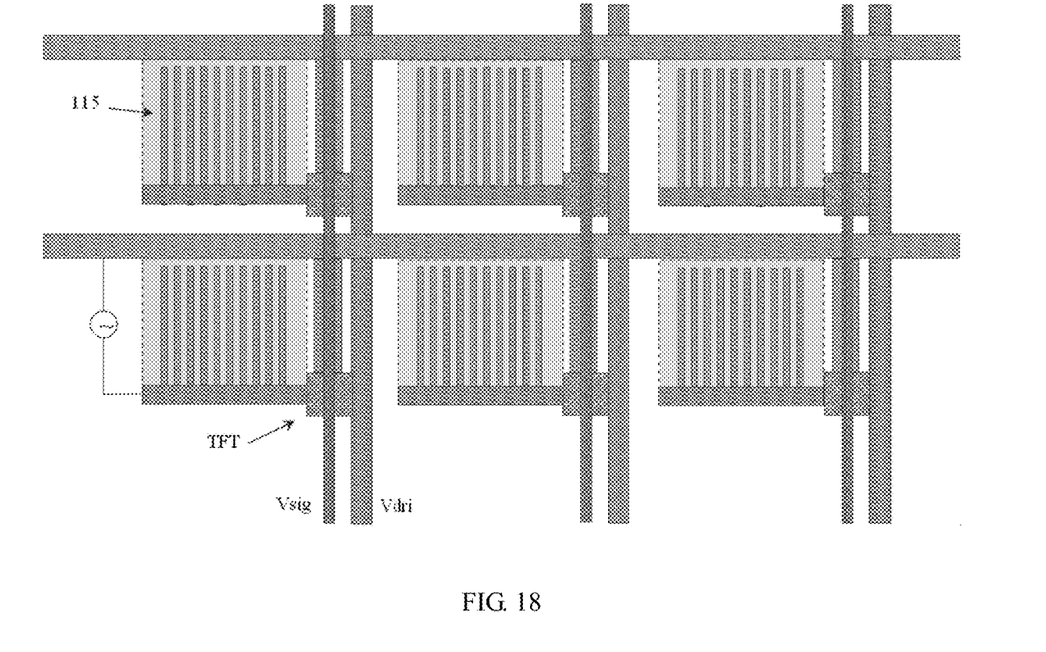
FIG. 18 is a schematic diagram of the ADS-VA driving mode of a display panel provided by an embodiment of the present disclosure.

For instance, FIGS. 16-18 are schematic structural views illustrating the pixel structure and wiring arrangement of a display panel adopting advanced super dimension switch (ADS) driving mode or vertical alignment (VA) driving mode.

As shown in FIG. 16, an electrode layer 105, a grating layer 104 and a liquid crystal layer 1031 disposed therebetween are respectively disposed on the facing surfaces of upper and lower substrates 102 and 101, and the upper substrate 102 and the lower substrate 101 are connected with each other through sealant 106. Wiring areas 12 divide the display panel into a plurality of pixel openings 115 or pixel units. Each pixel unit or pixel area 11 includes at least one electrode strip 1051 and at least one grating bar 1041 corresponding to each other. An insulating layer 108 is respectively disposed on the outside of the electrode layer 105 and the grating layer 104. A common electrode Vcom and an alignment electrode Vdri are respectively disposed on the outside of the insulating layers 108 (for instance, the alignment of liquid crystals may be realized by applying voltage signal(s) to the alignment electrodes when the alignment of the liquid crystals does not adopt the conventional chemical or physical method, and the alignment mode is not limited to a VA mode based on ADS wiring and may also be a VA mode based on IPS wiring, not shown). In this case, the electrode 105 may be driving electrode Vdri. In addition, upper and lower protective films 1071 and 1072 may also be respectively disposed on the outside of the upper and lower substrates. The planar common electrode and the alignment electrode may be ITO electrodes, however, the embodiment of the present disclosure is not limited thereto.

As shown in FIG. 17, in another embodiment of the present disclosure, the electrode layer 105 and the grating layer 104 may be sequentially disposed on one substrate. When disposed on one substrate, e.g., the upper substrate, the grating bars 1041 may be superimposed on the electrode strips 1051. In an embodiment, the width of the strip electrodes is not greater than the width of the grating bars.

As shown by the top view FIG. 18, the wiring areas include signal electrodes Vsig, driving electrodes Vdri, TFT switches and common electrodes Vcom. These structures may be separated from each other through insulating layers. Electrodes arranged in different layers but required to be connected may be connected with each other through via holes formed in corresponding insulating layers.

Figure 19:
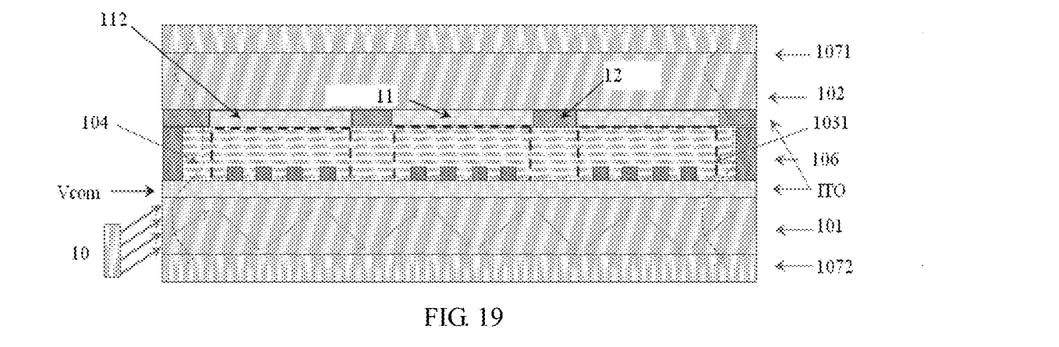
FIG. 19 is a schematic structural view 1 of the TN (Twisted Nematic)/ECB (Electrically Controlled Birefringence) driving mode of a display panel provided by an embodiment of the present disclosure.
Figure 20:
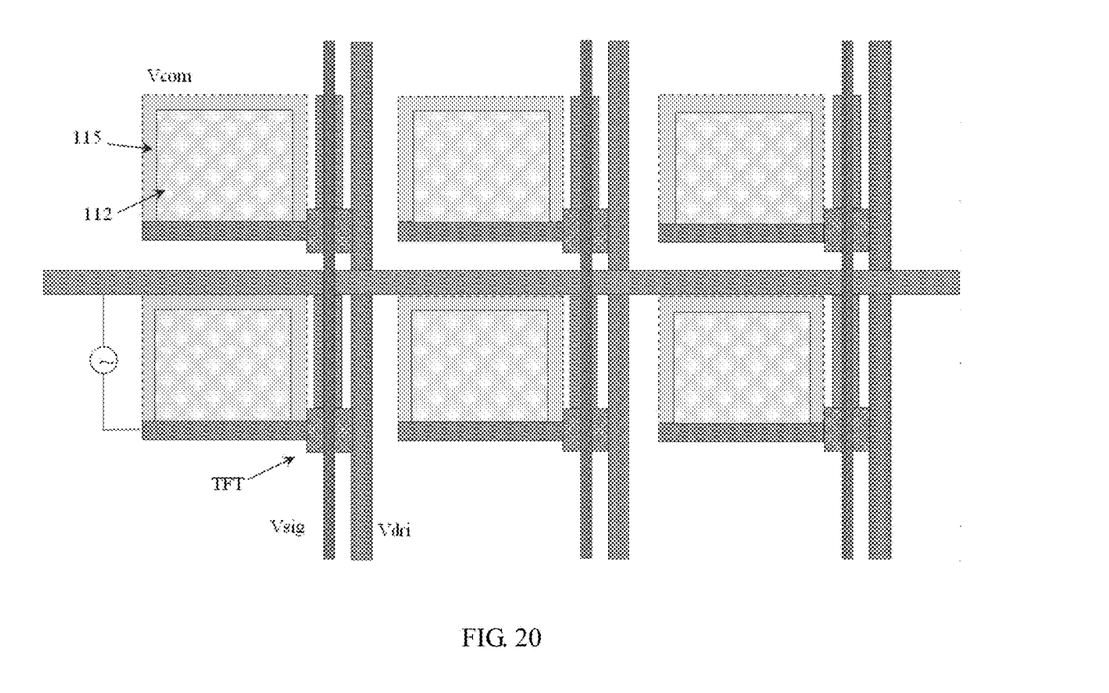
FIG. 20 is a schematic diagram of the TN/ECB driving mode of a display panel provided by an embodiment of the present disclosure.

For instance, FIGS. 19-20 are schematic structural views illustrating the pixel structure and wiring arrangement of a display panel adopting Twisted Nematic (TN) or Electrically Controlled Birefringence (ECB) driving mode.

As shown in FIG. 19, planar pixel electrodes 112, planar common electrodes Vcom, a grating layer 104 disposed on the common electrodes, and a liquid crystal layer 1031 disposed therebetween are respectively disposed on the facing surfaces of upper and lower substrates 102 and 101, and the upper substrate 102 and the lower substrate 101 are connected with each other through sealant 106. Wiring areas 12 divide the display panel into a plurality of pixel openings 115 or pixel units. Each pixel unit or area includes a pixel electrode block 11 and at least one grating bar 1041 corresponding to each other. In addition, upper and lower protective films 1071 and 1072 may also be respectively disposed on the outside of the upper and lower substrates.

As shown in FIG. 20, the wiring areas include signal electrodes Vsig, driving electrodes Vdri, TFT switches and common electrodes Vcom. These structures may be separated from each other through insulating layers. Electrodes arranged in different layers but required to be connected may be connected with each other through via holes formed in corresponding insulating layers.

The gratings in the embodiments of the present disclosure, for instance, include two types. For instance, one is to form the gratings by utilization of a medium, and the light extraction efficiency of the gratings is adjusted by utilization of the change of the refractive index of the liquid crystals. When the refractive index of the liquid crystals is equal to that of the gratings, no light is emitted, and the grayscale is the minimum grayscale L0. When the difference between the refractive index of the liquid crystals and the refractive index of the gratings is maximum, the strongest light is emitted, and the grayscale is the maximum grayscale L255. Other grayscales are provided under the state between the above two cases. The advantage of this type of gratings is that the diffraction efficiency can be very high. For instance, the other one is to form the gratings by utilization of the liquid crystals, namely the initial state of the liquid crystals is in even state, and no light is emitted (minimum grayscale L0). After a voltage is applied to the gate electrode(s), the liquid crystals are deflected by the formed electric fields; the refractive index distribution forms a grating arrangement; light in the light guide plate (LGP) is diffracted; and when the difference between the refractive index at different positions of the gratings formed by the liquid crystals is maximum, the strongest light is emitted (maximum grayscale L255). Other states are intermediate grayscales. The advantage of this kind of gratings is that it can easily ensure the complete consistency of the refractive index of the gratings in a liquid crystal cell; no light is leaked out under a dark state; the contrast is high; and meanwhile, the diffraction efficiency may also be very high.

An embodiment of the present disclosure also provides a display device, which comprises any foregoing display panel as shown in FIGS. 1-20.

The display device provided by the embodiment of the present disclosure may be any product or component with display function, such as a VR helmet, VR glasses, a mobile phone, a tablet PC, a TV, a display, a notebook computer, a digital picture frame and a navigator.

In the present disclosure, the light-emitting control layer is disposed between the upper and lower substrates and configured to control the light-emitting direction of the subpixel areas and allow the light-emitting direction of the subpixel areas to face the central portion of the display panel, so the direction control of emergent light of the display panel can be realized, and near eye display (NED) can be realized through the display panel. In addition, as the display device may not require a polarizer and the light-emitting control layer is also configured to control the light-emitting colors of the subpixel areas, the display panel may omit the original CF layer, so the transparency of the display panel can be greatly improved.

In an example of the embodiment of the present disclosure, the display device also comprises an edge-lit collimated light source. The edge-lit collimated light source is disposed on a side of the lower substrate. The edge-lit collimated light source and the lower substrate are adopted together to form a backlight of the display device.

The edge-lit collimated light source may be prepared by mixing light of RGB semiconductor laser chips, or it may also be prepared by collimating and mixing light of RGB light-emitting diode (LED) chips, or it may be prepared by the collimation of white-light LED chips, or it may be prepared by strip cold cathode fluorescent lamp (CCFL) lamps and a light collimating structure. The above light source structures are only examples. The light source in the embodiment of the present disclosure is not limited to the above structure. In order to be matched with the width of the lower substrate of the display panel, the edge-lit collimated light source may also be a laser chip or an LED chip bar of which the width is consistent with the width of the lower substrate, or a beam expanding structure may be disposed on the front of the laser chip or the LED chip bar. The light-emitting direction of the edge-lit collimated light source is required to form an included angle with the normal line of the lower substrate, so that a certain luminous efficiency of the wave-guide grating couplers can be achieved when the incident light forms total reflection in the lower substrate.

The described above are only exemplary embodiments of the present disclosure and not intended to limit the present disclosure. Any modification, equivalent replacement, improvement and the like made within the spirit and principle of the present disclosure shall fall within the scope of the present disclosure.

What is claimed is:

1. A display panel, comprising:
a lower substrate, an upper substrate cell-assembled together, and a liquid crystal layer between the lower substrate and the upper substrate;
a light-emitting control layer arranged between the lower substrate and the upper substrate; and
a plurality of pixel units defined by a plurality of data lines and gate lines intersected with each other, each pixel unit comprising a plurality of subpixel areas; and
one or more side surfaces of the lower substrate are configured to receive the incidence of collimated light;
wherein the light-emitting control layer comprises a grating layer wherein the grating layer comprises a plurality of grating bars, and an electrode layer comprising a plurality of strip electrodes, on a surface of one of the upper substrate or the lower substrate facing the other one of the upper substrate or the lower substrate; the grating bars are respectively superimposed on the strip electrodes directly, and the light-emitting control layer is configured to control the light-emitting directions and the light-emitting colors of the subpixel areas, to allow the light-emitting directions of the subpixel areas toward a central portion of the display panel, and the plurality of strip electrodes are configured to control a voltage applied to liquid crystals of the liquid crystal layer of each pixel to control the display grayscale of the pixels.

2. The display panel according to claim 1, wherein
wherein the refractive index of the grating layer is n, and $n_o \leq n \leq n_e$, where no refers to the ordinary refractive index of the liquid crystals, and $n_e$ refers to the extraordinary refractive index of the liquid crystals; and
the plurality of subpixel areas comprise RGB areas.

3. The display panel according to claim 2, wherein the plurality of grating bars respectively corresponds to the plurality of pixel units; and the grating period of the grating corresponding to each pixel unit is constant.

4. The display panel according to claim 3, wherein the electrode layer comprises a plurality of pairs of strip electrodes arranged in a same layer; and each subpixel area corresponds to at least one pair of strip electrodes.

5. The display panel according to claim 4, wherein the grating layer and the electrode layer are sequentially disposed on a surface of the lower substrate or the upper substrate facing the upper substrate or the lower substrate; or the grating layer is disposed on a surface of the lower substrate facing the upper substrate, and the electrode layer is disposed on a surface of the upper substrate facing the lower substrate.

6. The display panel according to claim 5, wherein the lower substrate comprises a base substrate and thin-film transistor (TFT) array units disposed on the base substrate, the TFT array units being electrically connected with the strip electrodes; or the upper substrate comprises a base substrate and TFT array units disposed on the base substrate, the TFT array units being electrically connected with the strip electrodes.

7. The display panel according to claim 3, wherein the electrode layer is planar electrodes; the electrode layer and the grating layer are sequentially disposed on a surface of the lower substrate facing the upper substrate;
the upper substrate is an array substrate, the array substrate comprising block electrodes respectively corresponding to the plurality of subpixel areas.

8. The display panel according to claim 2, wherein the thickness of the grating layer is from about 100 nm to about 1,500 nm.

9. The display panel according to claim 1, wherein the plurality of strip electrodes are disposed on a surface of the upper substrate facing the lower substrate, the plurality of strip electrodes are configured to divide the display panel into a plurality of strip spacer regions; and a given voltage is respectively applied to the liquid crystals in the regions, the voltage applied to the liquid crystals in each region being the same, and voltages applied to the liquid crystals in adjacent regions are different.

10. The display panel according to claim 1, wherein a quantum dot pixel layer is disposed on a surface of the upper substrate facing the lower substrate.

11. The display panel according to claim 1, further comprising a coupling grating layer, a filling layer and a wave guide layer disposed between the lower substrate and the light-emitting control layer and sequentially arranged on the lower substrate; the thickness of the lower substrate is greater than that of the wave guide layer; and the refractive index of the filling layer is less than that of the lower substrate.

12. A display device, comprising a display panel, wherein the display panel comprises:
a lower substrate, an upper substrate cell-assembled together, and a liquid crystal layer provided between the lower substrate and the upper substrate;
a light-emitting control layer arranged between the lower substrate and the upper substrate and comprises liquid crystals of the liquid crystal layer a grating layer comprising a plurality of grating bars, and an electrode layer comprising a plurality of strip electrodes; and
a plurality of pixel units defined by a plurality of data lines and gate lines intersected with each other, each pixel unit comprising a plurality of subpixel areas; and
one or more side surfaces of the lower substrate are configured to receive the incidence of collimated light;
wherein the liquid crystals are provided between the grating layer and the electrode layer, and slits between adjacent grating bars of the grating layer and slits between adjacent strip electrodes of the electrode layer are also filled with the liquid crystals, and the light-emitting control layer is configured to control the light-emitting directions and the light-emitting colors of the subpixel areas, to allow the light-emitting directions of the subpixel areas toward a central portion of the display panel and the light-emitting control layer is to control the display grayscale of the subpixel areas.

13. The display device according to claim 12, further comprising edge-lit collimated light sources disposed on one or more sides of the lower substrate, wherein the liquid crystals are blue phase liquid crystals.

14. The display panel according to claim 2, wherein the electrode layer is a transparent conductive material electrode layer or a metallic conductive material electrode layer, the transparent conductive material electrode layer having a thickness in a range of 50-1,000 nm, and the metallic conductive material electrode layer having a thickness in a range of 30-200 nm.

15. The display panel according to claim 2, wherein the light-emitting control layer comprises a plurality of light-emitting control areas; and each light-emitting control area is separated by a wiring area for separating the pixel areas, and comprises at least one of the strip electrodes and at least one of the grating bars corresponding to each other.

16. The display panel according to claim 15, wherein the at least one of the strip electrodes is a driving strip electrode; a plate common electrode is disposed on the driving strip electrode strip; and the plate common electrodes and the driving strip electrodes are spaced from each other through an insulating layer.

17. The display panel according to claim 15, wherein the wiring areas comprise signal electrodes, driving electrodes, TFT switches, and common electrodes; and these structures are separated from each other through the insulating layers.

18. The display panel according to claim 1, further comprising,
a first protective film provided on a surface of the upper substrate away from the lower substrate and configured to protect the display panel; and
a second protective film provided on a surface of the lower substrate away from the upper substrate and configured to protect the display panel;
wherein a refractive index of the first protective film is less than the refractive index of the upper substrate, and a refractive index of the second protective film is less than a refractive index of the lower substrate.

19. The display panel according to claim 5, wherein the grating layer and the electrode layer are sequentially disposed on one surface of the lower substrate or the upper substrate facing the upper substrate or the lower substrate, the strip electrodes are superimposed on the gratings, and each strip electrode has a width not greater than that of each grating bar.

20. A display device, comprising a display panel, wherein the display panel comprises:
a lower substrate, an upper substrate cell-assembled together, and a liquid crystal layer provided between the lower substrate and the upper substrate;
a light-emitting control layer arranged between the lower substrate and the upper substrate; and
a plurality of pixel units defined by a plurality of data lines and gate lines intersected with each other, each pixel unit comprising a plurality of subpixel areas; and
one or more side surfaces of the lower substrate are configured to receive the incidence of collimated light;
wherein the light-emitting control layer comprises a grating layer comprising a plurality of grating bars, and an electrode layer comprising a plurality of strip electrodes, on a surface of one of the upper substrate or the lower substrate facing the other one of the upper substrate or the lower substrate; the grating bars are respectively superimposed on the strip electrodes directly, and the light-emitting control layer is configured to control the light-emitting directions and the light-emitting colors of the subpixel areas, to allow a the light-emitting directions of the subpixel areas toward a central portion of the display panel, and the light-emitting control layer is also configured to control the display grayscale of the subpixel areas; and
wherein the refractive index of the grating layer is n, and $n_o \leq n \leq n_e$, where no refers to the ordinary refractive index of the liquid crystals, and ne refers to the extraordinary refractive index of the liquid crystals; and
the plurality of subpixel areas comprise RGB areas.

* * * * *